United States Patent
Johnson et al.

(10) Patent No.: US 6,832,333 B2
(45) Date of Patent: Dec. 14, 2004

(54) METHOD FOR SUPPORTING USER LEVEL ONLINE DIAGNOSTICS ON LINUX

(75) Inventors: Donald K. Johnson, Portland, OR (US); Daniel E. Stekloff, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 09/944,264

(22) Filed: Aug. 30, 2001

(65) Prior Publication Data

US 2003/0046606 A1 Mar. 6, 2003

(51) Int. Cl.[7] ............................................. G06F 11/00
(52) U.S. Cl. ........................ 714/25; 714/42; 711/170
(58) Field of Search ........................ 714/25, 38, 42; 711/170, 173

(56) References Cited

U.S. PATENT DOCUMENTS

| | | | |
|---|---|---|---|
| 6,226,725 B1 * | 5/2001 | Yarborough | 711/170 |
| 6,256,523 B1 * | 7/2001 | Diab et al. | 600/323 |
| 2002/0038437 A1 * | 3/2002 | Hogdal et al. | 714/25 |
| 2003/0074604 A1 * | 4/2003 | Mathias et al. | 714/38 |

OTHER PUBLICATIONS

Frey, Martin, "Linux: mapping driver memory into user space," http://www.scs.ch/~frey/linux/memorymap.html, Jun. 10, 2001.*

"Linux: mapping driver memory into user space," http://www.scs.ch/~frey/linux/memorymap.html, Oct. 17, 2001.

"<tt>mmap()</tt> kernel memory to user-space," http://kernelnewbies.org/code/mmap/, Oct. 17, 2001.

* cited by examiner

Primary Examiner—Robert Beausoliel
Assistant Examiner—Marc Duncan
(74) Attorney, Agent, or Firm—Lieberman & Brandsdorfer, LLC

(57) ABSTRACT

A module is provided to support online cache diagnostics in a Linux operating system. The module is dynamically loaded to a kernel of the operating system. Upon activation, the module allocates memory for a user level program and a manager maps a contiguous buffer of memory from a kernel address space to a user process address space. The buffer is contiguous in both the physical and virtual address space. Physical memory displacement between access is controlled from the user level. Accordingly, the module enables allocation of contiguous lines of memory from the kernel to the user space in which control of the memory displacement occurs at the user level.

18 Claims, 3 Drawing Sheets

METHOD FOR SUPPORTING USER LEVEL ONLINE DIAGNOSTICS ON LINUX

BACKGROUND OF THE INVENTION

1. Technical Field

This invention relates to a module for supporting online diagnostics in a Linux operating system. More specifically, the module enables mapping of contiguous physical memory from kernel address space to a user level address space.

2. Description of the Prior Art

Conventional memory allocators return memory which is contiguous in the virtual address space but is not guaranteed to be contiguous in the physical address space. For example, the Linux operating system's user level kernel memory allocator (malloc) does not allocate memory blocks which are guaranteed to be contiguous in the physical address space. Accordingly, memory allocated using conventional mechanisms are not guaranteed to be usable for online cache testing in the Linux operating system environment.

In prior art computer systems utilizing the Unix operating system, a special memory buffer is allocated during kernel initialization to allow online processor cache testing. The memory buffer is mapped from the kernel level to the user level program. The buffer accounts for the requirement of allocating memory returns that are contiguous in both the virtual address space and the physical address space. However, the prior art memory buffer requires modification of the kernel by allocating the memory buffer during kernel initialization. In addition, the prior art memory buffer allocated at initialization remains in the system even when it is not required. Accordingly, the prior art memory buffer for the Unix operating system is static and does not allow active allocation of memory on an as needed basis.

There is therefore a need for a module that will allow user level processes to generate memory access which can be used to test the hardware caches in a Linux operating system on an as needed basis. The module must return memory to the user level which is contiguous in both the virtual and physical address spaces. Accordingly, it is desirable to provide a module that allows online testing of hardware cache without changing the kernel of the operating system.

SUMMARY OF THE INVENTION

This invention comprises a module for supporting online cache diagnostics in a Linux operating system. The module is dynamically loadable from the user space.

A first aspect of the invention is a method for supporting memory diagnostics. A module is loaded to a kernel of the operating system. A block of contiguous memory is allocated. Contiguous memory is mapped from the kernel address space to the user process address space. Control of the physical memory displacement between accesses is controlled from the user level. The memory is contiguous in both physical and virtual address spaces.

A second aspect of the invention is a computer system which includes a module adapted to be dynamically loaded to a kernel of an operating system. The module includes a manager to allocate contiguous memory. The manager maps contiguous physical memory from a kernel address space to a user process address space. The memory is contiguous in both the physical and virtual address space. A user level program controls physical memory displacement between accesses.

A third aspect of the invention is an article comprising a computer-readable signal bearing medium. In the medium, the article includes a module adapted to be dynamically loaded to a kernel of an operating system for allocating a block of contiguous memory. The module includes a manager for mapping contiguous memory from a kernel address space to a user process address space. A user level program controls physical memory displacements between accesses.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Most known schemes for mapping hardware cache lines include using part of the physical address space and require the memory used in that physical address space to be physically contiguous. In addition, in order to preserve relative displacements between memory locations, the memory used should also be contiguous in the virtual address space. Memory which is contiguous in the virtual address space may not be contiguous in the physical address space. The method and system of the preferred embodiment employ a module adapted to be loaded to the kernel to allow user level programs to conduct online diagnostics of cache hardware using physically and virtually contiguous memory while the system is operating under a normal workload.

Technical Background

The Linux kernel has a Kernel Memory Allocator which always returns memory which is contiguous in both the virtual and physical address spaces. However, user level programs do not have access to the Kernel Memory Allocator. By designing a diagnostic tool that allows the user level the ability to access the Kernel Memory Allocator, the requirement that contiguous lines of memory in both the virtual and physical address spaces be provided for diagnostic tools requiring such contiguous virtual and physical memory can be met through accesses by user processes.

Linux operating systems are designed to accommodate modules. A module functions as an extension to the kernel and mirrors a device driver without accessing hardware, i.e. a pseudo device driver. During use, the module is accessed using device characteristics.

The module 20 of the preferred embodiment of the invention is loaded to the kernel level of the operating system and enables user level programs to have access to the Kernel Memory Allocator. The module does not modify the kernel. Rather, the module is available for activation from the user space.

Figure 1:
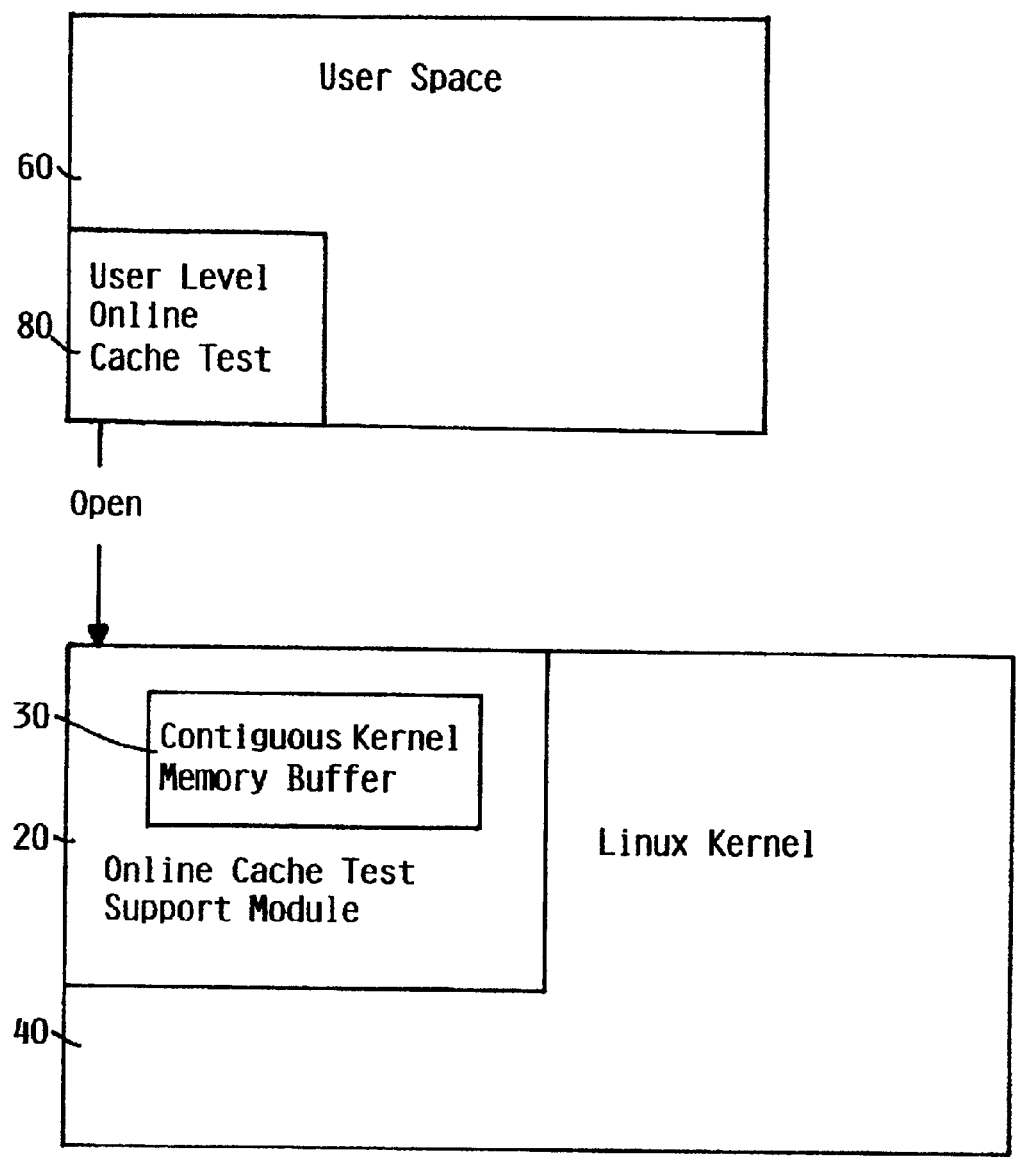
FIG. 1 is a block diagram illustrating placement of the module within the Linux kernel.

The module is specifically designed to allow online cache diagnostic testing. When the module is not activated it remains in the kernel without performing any mapping functions. FIG. 1 is an illustration of the module in an inactive state. The module 20 is loaded into the kernel level 40 of the operating system. A kernel memory buffer 30 is allocated when the module 20 is loaded. The buffer is allocated even when diagnostics are not being conducted. The user level 60 has an area 80 designated for conducting online cache diagnostics. However, in this illustration there are no diagnostics being conducted, and as such the kernel memory buffer is not mapped to the diagnostic process's user space.

Figure 2:
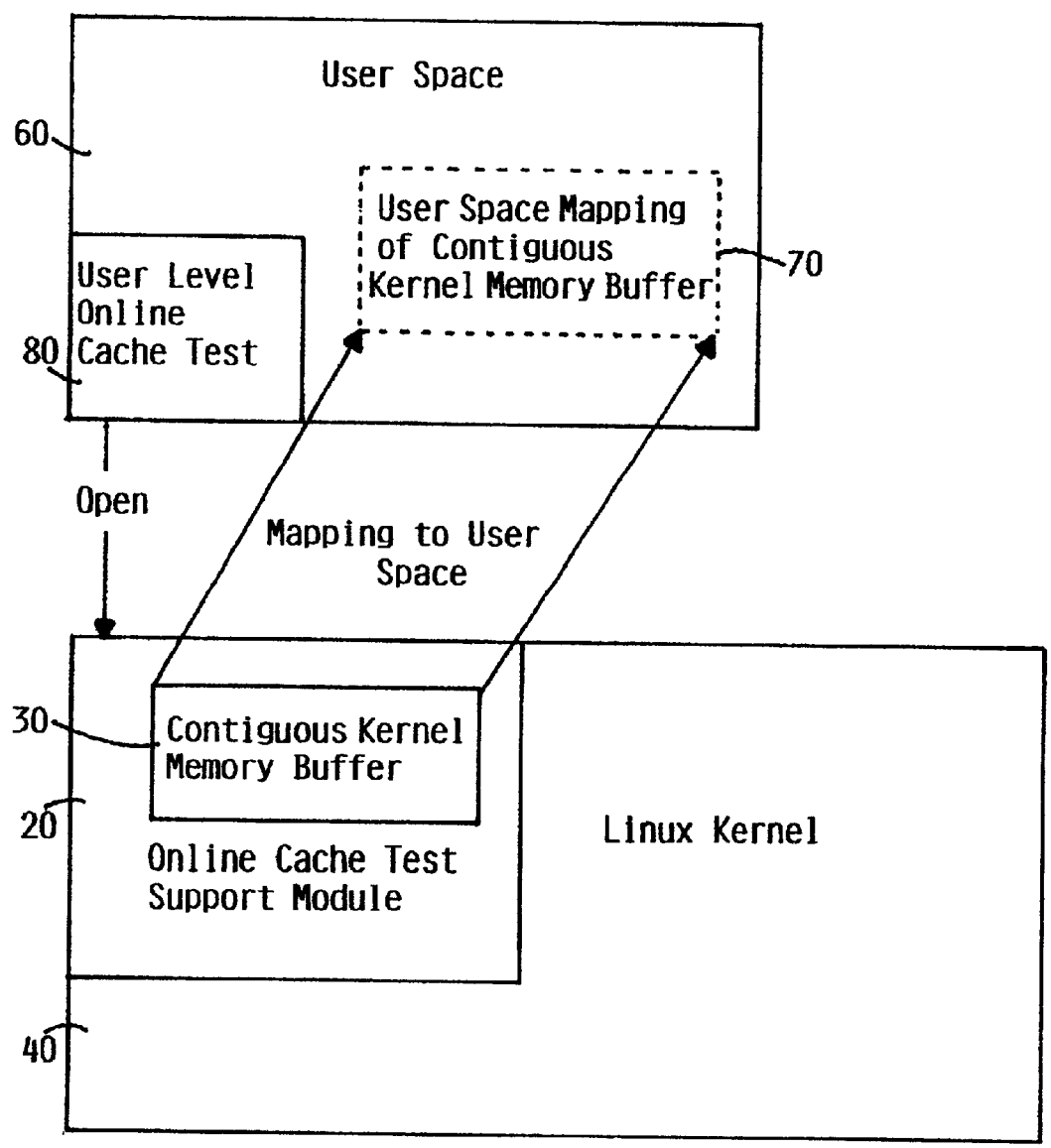
FIG. 2 is a block diagram illustrating mapping from the kernel to a user process space according to the preferred embodiment of this invention, and is suggested for printing on the first page of the issued patent.

The module 20 is designed to be accessed from the user level 60. FIG. 2 is an illustration of the module in an active state. The module 20 is accessed by a computer operator in the user level 60. A user process initiating an online cache diagnostic executes an open operation (open) followed by a memory map operation (mmap) from the user level. This causes the module to map a contiguous kernel memory buffer 30 from the kernel level 40 to the user level memory buffer 70. The online cache diagnostic uses the mapping to generate accesses to contiguous lines of virtual and physical memory. Since the buffer is contiguous in both the physical and virtual address spaces, the online diagnostic can control the physical memory displacements between accesses. In addition, the control of the physical memory displacements enables oversight and enforcement of specific cache operations. The memory buffer 30,70 is only mapped when accessed from the online diagnostic 80 in the user level 60. Once the online diagnostic is completed, the mapping is discontinued. However, the module 20 does remain in the kernel. Accordingly, the module enables mapping of a memory buffer from the kernel to the user level on an as needed basis.

Figure 3:
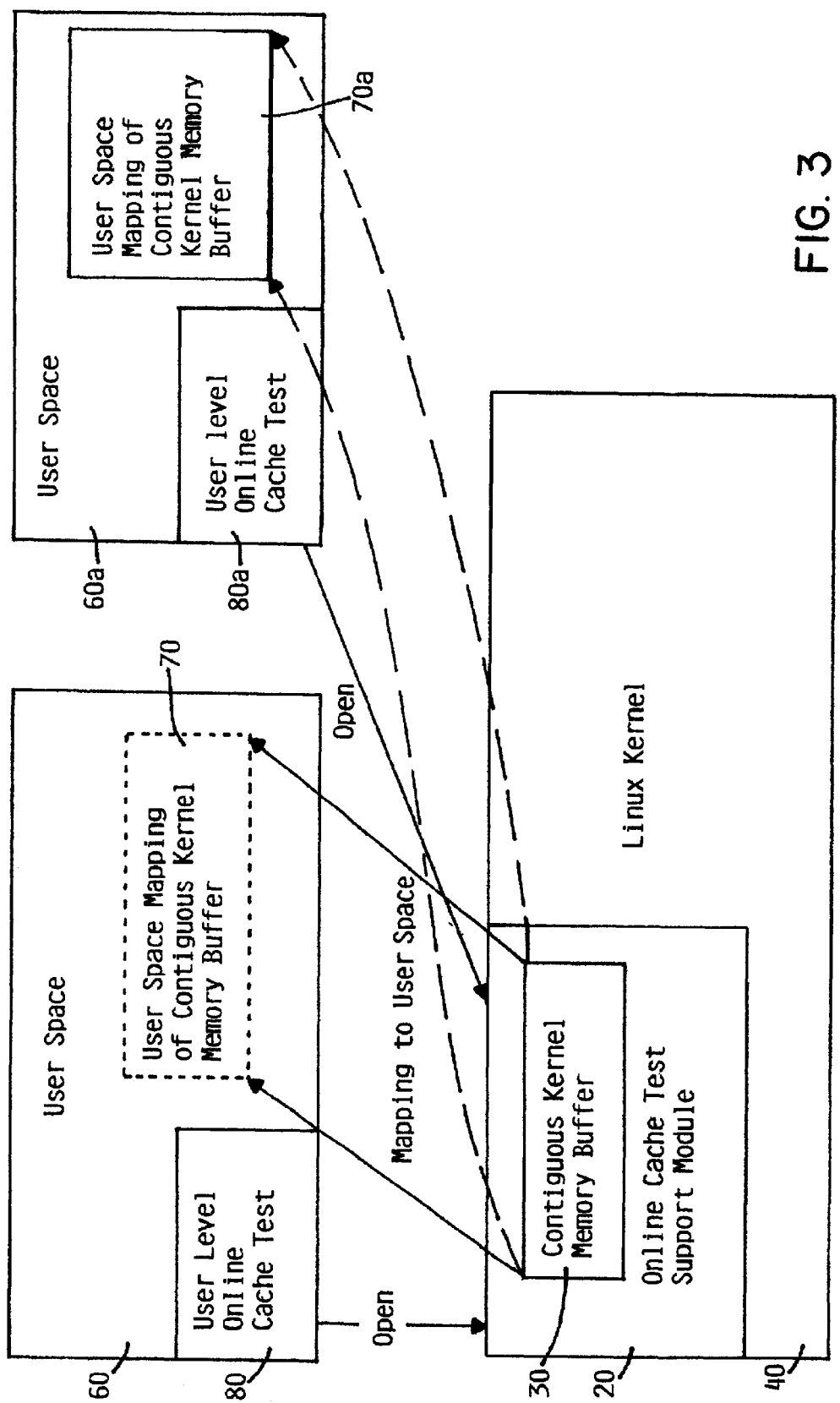
FIG. 3 is a block diagram illustrating mapping from the kernel to multiple user processes.

The module 20 shown in FIG. 2 is an illustration of a single user process accessing the contiguous kernel memory buffer. However, the same module 20 is adapted to map to multiple user processes concurrently. FIG. 3 is an illustration of two user processes utilizing the online cache test support module. Similar to a single user process, a second mapping 70a of contiguous kernel memory buffer 30 is allocated from the kernel 40 to the user space 60a. This same kernel memory buffer 30 is mapped to the user process of all the user level programs which have access to the module 20, thereby enabling testing of inter-processor cache coherency features. Accordingly, processes running on different processors may access the same physical memory.

In a further embodiment, this module may be adapted to processors and systems which have different caching structures. The module 20 provides a generic mechanism for mapping contiguous memory from the kernel level 40 to the user level 60. The module 20 provides support for testing all standard memory caching hardware. The memory buffer is created when the module is accessed from the user space. The detailed knowledge required to test the cache is contained in the user level test program and not in the module 20. Accordingly, the module 20 is merely a tool for enabling cache testing on any hardware platform.

Advantages Over the Prior Art

The module of the preferred embodiment enables user level processes to generate memory accesses which can be used to test the hardware caches. The buffer created by the module is contiguous in both the virtual and physical memory address space. Since the memory being accessed is contiguous, cache replacement line algorithms can be tested at the same time. In addition, the module does not require modification to the kernel. Similar to a driver, the module is dynamic and only functions when it is accessed from the user level. Accordingly, the module functions as a pseudo driver that is loadable to the kernel subsequent to initialization, and it enables diagnostic testing of cache hardware from the user level in a dynamic mode.

Alternative Embodiments

It will be appreciated that, although specific embodiments of the invention have been described herein for purposes of illustration, various modifications may be made without departing from the spirit and scope of the invention. In particular, the module may be designed to allocate memory buffers upon request. The memory buffer would only be present upon activation from the module, being deallocated upon deactivation of the module. Therefore system resources would be minimized when they are not active. Accordingly, the scope of protection of this invention is limited only by the following claims and their equivalents.

We claim:

1. A method for performing memory diagnostics in a computer system, comprising:
   (a) dynamically loading a module to a kernel of an operating system running in said computer system;
   (b) allocating contiguous physical memory by said kernel;
   (c) accessing said contiguous physical memory from a user process address space of a user level program; and
   (d) performing cache hardware diagnostics on said contiguous physical memory by said user level program.

2. The method of claim 1, wherein said accessing said contiguous physical memory comprises mapping said contiguous physical memory from a kernel address space to said user process address space.

3. The method of claim 1, wherein said user level program controls physical memory displacements between accesses.

4. The method of claim 1, further comprising the step of deallocating the memory.

5. The method of claim 4, further comprising the step of dynamically unloading the module.

6. The method of claim 1, wherein said contiguous physical memory is also contiguous virtually.

7. A computer system, comprising:
   a dynamically loadable kernel module of an operating system running in said computer system;
   a kernel memory allocator responsive to said module, said allocator allocating contiguous physical memory;
   a user process address space capable of accessing said contiguous physical memory; and
   a user level cache hardware diagnostic program capable of running in said user process address space.

8. The system of claim 7, wherein said contiguous physical memory is mapped from a kernel address space to said user process address space.

9. The system of claim 7, wherein said user level memory diagnostic program controls physical memory displacements between accesses.

10. The system of claim 7, wherein said contiguous physical memory is also contiguous virtually.

11. An article comprising:
    a computer-readable signal-bearing medium;
    a dynamically loadable kernel module of an operating system in said medium, said module allocating contiguous physical memory; and
    a user level cache hardware diagnostic program in said medium capable of running in a user process address space for accessing said contiguous physical memory.

12. The article of claim 11, wherein the medium is selected from the group consisting of: a recordable data storage medium, and a modulated carrier signal.

13. The article of claim 11, wherein said module maps said contiguous physical memory from a kernel address space to said user process address space.

14. The article of claim 11, wherein said user level memory diagnostic program controls physical memory displacements between accesses.

15. A method for performing memory diagnostics in a computer system, comprising:
   (a) dynamically loading a module to a kernel of an operating system running in said computer system;
   (b) allocating contiguous physical memory by said kernel;
   (c) mapping said contiguous physical memory from a kernel address space to a user process address space of a user level program; and
   (d) performing cache hardware diagnostics on said contiguous physical memory by said user level program.

16. The method of claim 15, wherein said user level program controls physical memory displacements between accesses.

17. The method of claim 15, further comprising the step of deallocating the memory.

18. The method of claim 17, further comprising the step of dynamically unloading the module.

* * * * *